United States Patent Office 3,280,189
Patented Oct. 18, 1966

3,280,189
PREPARATION OF ALCOHOL BLOCKED N-HYDROXYMETHYL UNSATURATED ACID AMIDES
Oliver I. Cline, Jr., Louisville, Ky., assignor, by mesne assignments, to Devoe & Raynolds Company, Inc., a corporation of Delaware
No Drawing. Filed Nov. 17, 1961, Ser. No. 153,209
9 Claims. (Cl. 260—561)

This invention, in one of its embodiments, pertains to the preparation of N-alkoxymethyl or N-aralkoxymethyl acid amides from short chain unsaturated carboxylic acid amides. In another of its embodiments, the invention provides a novel method for preparing alcohol blocked N-hydroxymethyl acrylamides, methacrylamides, crotonamides, and the like from the methylol amide.

The N-alkoxymethyl, N-alkenoxymethyl or N-aralkoxymethyl unsaturated acid amides of this invention are the methyl, butyl, hexyl, allyl, octyl and benzyl alcohol ethers of the N-methylol carboxylic acid amide. Hereinafter, these will be termed alcohol blocked N-hydroxymethyl unsaturated acid amides. These alcohol blocked N-hydroxymethyl unsaturated acid amides are becoming increasingly useful monomers because their polymers, particularly solution and emulsion polymerized copolymers, form products having outstanding physical and chemical properties. Alcohol blocked N-hydroxymethyl unsaturated acid amides are used as textile treating solutions to improve crease retention, that is, to provide non-wrinkling "wash and wear" fabrics. Their copolymer latexes form films having excellent properties on both wood and metal and resins formed by the polymerization of alcohol blocked N-hydroxymethyl unsaturated acid amides are especially useful as sizing agents for fabrics and paper. These alcohol blocked N-hydroxymethyl unsaturated acid amide resinous copolymers can also be readily blended with other resins such as urea and melamine resins and epoxide resins.

The chemistry of the preparation of alcohol blocked N-hydroxymethyl unsaturated acid amides is well known and is treated in various journal articles. It is also well described in Australian Patent 236,183, which discloses amides of such acids as acrylic, fumaric, crotonic, itaconic, and methacrylic acid. To make the alcohol blocked N-hydroxymethyl unsaturated acid amide, the acid amide, an alcohol and formaldehyde are employed. The reaction of such unsaturated amides with alkanols and formaldehyde is represented in Australian Patent 236,183 as follows:

(1) 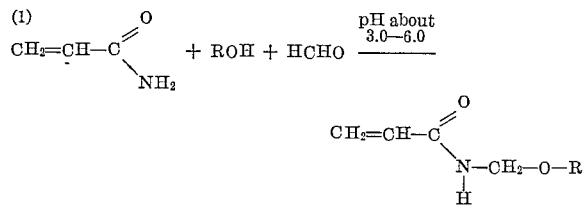

Since the chemistry of the reactions involved in the preparation of alcohol blocked N-hydroxymethyl unsaturated acid amides is known, the preparation of the product according to reaction 1 would appear to present no real problem. This is not true, however, because a number of reactions actually occur in the process, and some of these form side reaction products which render the process difficult to carry out commercially.

When alcohol blocked N-hydroxymethyl unsaturated acid amides are made from an acid amide, an alcohol, and formaldehyde under acid conditions, according to process 1, two sets of competing reactions actually occur which account for the product. Using acrylamide as an example, the first set of reactions involves the formation of N-methylol acrylamide by the reaction of acrylamide with the aldehyde. Subsequently, the N-methylol acrylamide reacts with the alcohol to form the N-alkoxymethyl or N-aralkoxymethyl acrylamide. These reactions are represented by Equations 2a and 2b as follows:

(2) 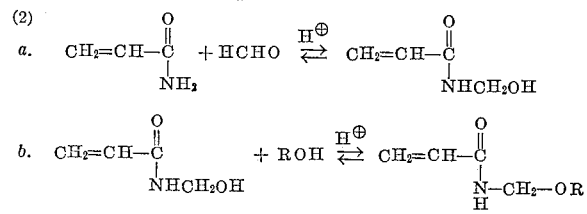

The other set of competing reactions also occurring at the pH of 3 to 6 involves the formation of a hemiformal, and the reaction of this formal with acrylamide to form the N-alkoxymethyl or N-aralkoxymethyl acrylamide according to Equations 3a and 3b:

(3) 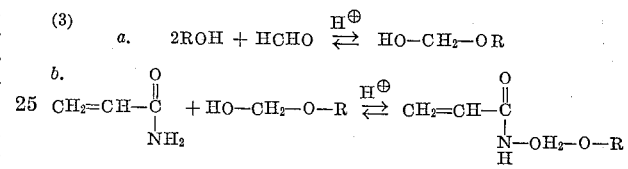

In addition to these two sets of reversible reactions, various side reactions are also taking place in the above described process. Of these side reactions, the most troublesome, and perhaps the one occurring to the greatest extent is the following reaction leading to the formation of methylene bis-N-acrylamide:

(4) 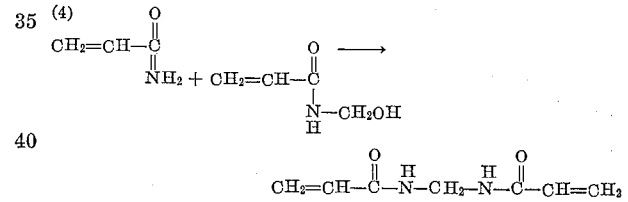

This reaction is irreversible and it can be seen that both intermediate and initial reactants are consumed by it. As the quantity of formaldehyde decreases and amount of methylolacrylamide increases, the probability of this reaction also increases.

Another side reaction results from the reaction of two mols of N-methylol acrylamide as follows:

(5) 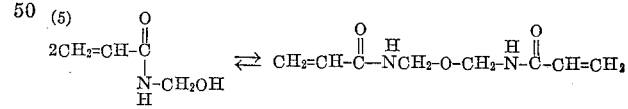

Another possible side reaction, but one which appears to have little tendency to occur, is the reaction of acrylamide with the alcohol according to the equation:

(6) 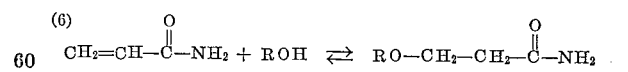

In addition to the foregoing reactions, there is always the possibility of polymerization since the amide starting material, N-methylol acrylamide, N-alkoxy or N-aralkoxy methyl acrylamide and methylene bis-N-acrylamide, all present in this system, are polymerizable.

It is thus evident that while alcohol blocked N-hydroxymethyl unsaturated acid amides are industrially important monomers, a process for their preparation and separation on a commercial scale must take into account the formation of side reaction products, especially methylene bis-N-acrylamide. By the practice of this invention, alcohol blocked N-hydroxymethyl unsaturated acid amides are made by a method which utilizes and minimizes side reactions to such an extent that a substantially pure product is obtained. Only the solvent need be stripped off if desired.

The formation of methylene bis-N-acrylamide by reaction 4 is the most hindering of the side reactions. If methylene bis-N-acrylamide is not removed from the system, it promotes cross-linking when the alcohol blocked N-hydroxymethyl unsaturated acid amide is used as a monomer in polymerization. Moreover, methylene bis-N-acrylamide is difficult to remove from the system. Water has been used for this purpose but many alcohol blocked N-hydroxymethyl unsaturated acid amides are water soluble as well as the methylene bis-N-acrylamide. Hence, water cannot always be used. In addition, even when the alcohol blocked N-hydroxymethyl compound is not water soluble, the use of water tends to form an emulsion which is difficult to break. In accordance with this invention, however, reaction 4 presents no problem. In addition, side reaction 5 can be utilized, and side reactions 3a, 3b and 6 do not occur to any noticeable degree during the process contemplated herein. An advantage of this invention is that while side reaction 5 can occur, this reaction is not detrimental as in prior processes because this reaction is utilized later in the process.

In accordance with the process of this invention, it has been found that reactions 2a and 2b can be carried out separately. Moreover, reaction 2a, when carried out alone, can be conducted under conditions so that acrylamide and N-methylol acrylamide do not react according to reaction 4. Since, according to this invention, reactions 2a and 2b are now separate reactions, the process of this invention is essentially a two-stage process. It has been found that if an amphiprotic solvent is used as the reaction medium in the first stage, and if the reaction medium is controlled during the course of the reaction so that it is alkaline, the acrylamide or other amide reacts with the aldehyde with virtually none of the aforementioned side reactions taking place. It has been found that side reaction 4 takes place only when the medium is acidic. Hence, methylene bis-N-acrylamide does not form in the first stage.

Reaction 2b occurs only in acid medium. Accordingly, this reaction can be carried out separately. In this second stage, methylene bis-N-acrylamide forms only to the extent that the N-methylol unsaturated acid amide disassociates during the N-methylol acid amide-alcohol reaction (reaction 2b). The amount formed is thus practically nil. Reaction 5 occurs only in the second stage. However, an excess of alcohol can be employed in this stage, which excess reacts with this ether to form two mols of the desired alcohol blocked N-hydroxymethyl unsaturated acid amide.

The first stage reaction between acrylamide and formaldehyde, found to be ionic, is carried out in an amphiprotic solvent. Amphiprotic solvents are well known and include alcohols and water. Non-polar solvents, even though of comparatively high dielectric properties, appear to retard the reaction, whereas amphiprotic solvents do not. Alcohols have been found to be better solvents than other amphiprotic solvents. Accordingly, alcohols having less than five carbon atoms such as ethanol, butanol, and isopropanol are preferred to water and long chain alcohols. "Formaldehyde" as used herein, includes those substances such as paraformaldehyde yielding formaldehyde under basic or thermal conditions.

The second stage of the process involves reacting the N-methylol acrylamide under acid conditions and, according to reaction 2b, with the alcohol desired for the ether formed, that is, for the formation of the desired alkoxy or aralkoxy group. This stage of the process would normally lead to the formation of methylene bis-N-acrylamide according to reaction 4. However by this invention, since the N-methylol acrylamide was made in an amphiprotic solvent under the alkaline conditions in the first stage, the unreacted amide can be insolubilized prior to this second stage by subsequent addition of non-polar solvent. Accordingly, on completion of reaction 2a, a non-polar solvent particularly such aromatic hydrocarbons as benzene, xylene, or toluene is added in an amount sufficient to render unreacted amide insoluble. This unreacted amide is then filtered out or otherwise removed before the second stage is carried out. Suitable non-polar solvents are aprotic solvents having dielectric constants of not over five. Other aprotic solvents having such constants less than six are the petroleum naphthas, cyclohexane, pentane, octane and the like.

As indicated, the alcohol employed in the second stage depends upon the desired N-alkoxy or N-aralkoxy group. Generally, however, alcohols of over twelve carbon atoms find little utility. Accordingly, we prefer alcohols of not over twelve carbon atoms such as methanol, ethanol, propanol, butyl alcohol, amyl alcohol, octanol, decanol, dodecanol, allyl alcohol, benzyl alcohol and the like. For water souble compositions, alcohols having one to four carbon atoms are used, whereas alcohols having four to twelve carbon atoms are employed for water insoluble products.

It is seen that in the first stage the reaction medium is basic and in the second stage it is acidic. In one of its aspects, this invention involves the provision of an acid system for the second stage which renders it unnecessary later to distill the product. This embodiment of the invention contemplates using an inorganic base in the first stage and an acid in the second stage so that the salt formed by the reaction of the two is insoluble in the mixture of the alcohol, the amphiprotic solvent, and the nonpolar solvent, hereinafter termed the "alcohol-amphiprotic-nonpolar solvent mixture" serving as the reaction medium for the second stage. This makes it possible to filter out the salt at the end of the second stage, the result being a substantially pure solution of N-alkoxymethyl acrylamide. Sufficient inorganic acid is used to neutralize the inorganic base used in the first stage and to give the desired pH in the second stage, the acid being added during the course of the reaction to maintain this pH. Acid remaining at the end of the reaction can be neutralized with a small amount of the inorganic base which will form the insoluble salt. Inorganic base includes alkali metal and alkaline earth metal hydroxides such as sodium hydroxide, calcium hydroxide, potassium hydroxide, barium hydroxide, lithium hydroxide, magnesium hydroxide and the like.

It is seen that by this process, a neutral, and therefore stable, alcohol blocked N-hydroxymethyl acrylamide solution can be made. If the N-alkoxymethyl or N-aralkoxymethyl acrylamide is desired free of solvent, this solvent liberation can be accomplished merely by stripping out the solvent at elevated temperatures. The distillation can be carried out so that there is much less tendency toward homopolymerization than is the case when other purification techniques must be resorted to. There is, of course, a tendency toward homopolymerization of N-methylol acrylamide during the second stage reaction. However, by the process of this invention, the tendency is mitigated by the use of a high concentration of solvents making the N-methylol acrylamide more dilute. In addition, a polymerization inhibitor such as hydroquinone, catechol, p-benzoquinone, or the monomethylether of hydroquinone can be added to the system. Considering the excess alcohol employed in this second stage, a ratio of 1.5 to 10 mols of alcohol per mol of N-methylol acrylamide is usually sufficient. A ratio of about 3 mols of alcohol per mol of N-methylol acrylamide is generally preferred, since amphiprotic and non-polar solvents are also present.

Referring more specifically to the process of this invention, as indicated hereinbefore, since the reaction between the unsaturated acid amide and the aldehyde is ionic, it is carried out in an amphiprotic solvent. This reaction is also reversible and, therefore, the equilibrium is shifted by the use of excess formaldehyde. The amphiprotic solvent, and the amide, such as acrylamide, are admitted to the reactor, sufficient amphiprotic solvent being used to form a solution at the reaction temperature. This reaction temperature is generally 40° C. to 70° C., preferably 50° C. to 60° C. The amount of amphiprotic solvent used, while sufficient to provide a reaction medium, should be confined to this minimum for practical reasons. If too much amphiprotic solvent is used, more non-polar solvent is required in the precipitation of the unsaturated acid amide. The reaction rate of reaction 6, relative to reaction 2a, is so slow that the resulting ether does not form in any appreciable amount, even when the amount of amphiprotic solvent is increased. This being the case, the amount of amphiprotic solvent is determined more by practical than by theoretical considerations. The minimum amount is readily determined in each particular instance at the reaction temperature, since this amount will vary with the particular unsaturated amide. Usually the amount of amphiprotic solvent will be at least 35 to 50 percent by weight of the amide. When the solution is formed, for instance, at 50° C., the formaldehyde is added to the reactor followed by a slow addition of the inorganic base, preferably an aqueous caustic alkali solution. Since the equilibrium is shifted by the use of excess formaldehyde, it is preferred to use more than the theoretical amount of one mol aldehyde per one mol of unsaturated acid amide. If only sufficient amphiprotic solvent is used to form the solution needed for reaction, the amount of aldehyde will be in the range of 2 to 10 mols aldehyde per mol of unsaturated acid amide. However, if more amphiprotic solvent is employed, than a correspondingly greater amount of formaldehyde will be required, perhaps as many as 15 mols per mol of unsaturated acid amide.

The unsaturated acid amide-aldehyde reaction mixture is kept on the basic side during the reaction to prevent the direct formation of methylene bis-N-acrylamide according to reaction 4. Here again, certain factors will determine the amount of inorganic base employed. Thus, while a pH of say, 7 to 8.5 can be used, reaction time is undesirably long. If the pH is above 9.5, the amide employed will begin to hydrolyze. If hydrolysis is to be essentially prevented, the pH should not be permitted to go much above 9.5. Inasmuch as below a pH about 8.5, the reaction time increases, a desirable pH range is 8.5 to 9.5. Since it is desirable to maintain a constant pH value throughout the reaction, inorganic base is added during the course of the reaction, rather than merely at the beginning. The pH is determined periodically at the reaction proceeds.

In order to carry out the second stage reaction, the reaction mixture from the first stage is cooled and the non-polar solvent is added to the cooled product to precipitate the insoluble, unreacted, unsaturated acid amide. As in the case of the amphiprotic solvent, the amount of non-polar solvent also depends on other solvents in the system. Hence, it is best based on the amphiprotic solvent. Usually one-half to fifteen mols of non-polar solvent per mol of amphiprotic solvent are used. The unreacted amide is then separated by physical means such as by filtration from the N-methylol unsaturated acid amide. After the removal of the insolubilized unsaturated acid amide, the second stage reaction is carried out according to Equation 2b, but at a pH in the range of 2.5 to 6, preferably 3 to 4, which is maintained throughout the reaction period by the addition of a dilute solution of a strong acid, preferably an acid such as phosphoric which will form an insoluble salt with the base used. Thus, while in the two stages, any acid and any inorganic base can be employed if the composition is to be used immediately, neutral, salt-free, compositions are necessary for stable products. It has been found that the most convenient method for removing salt from the product solution is to use an inorganic base and an acid which, when reacted with each other, form a salt which is insoluble in the reaction medium. Acids reacting with the aforementioned bases to form salts insoluble in this system are well known to those skilled in the art. Such acids are inorganic oxyacids, or compositions yielding such compounds on decomposition, short chain organic acids such as formic and acetic and various inorganic acids forming such salts as potassium, sodium acetate, nitrate, potassium phosphate, potassium sulfate, sodium phosphate, calcium orthophosphate, and the like. The reaction medium is a mixture of the excess alcohol employed in this second stage with non-polar and amphiprotic solvents remaining after the filtration or other N-methylol unsaturated acid amide removal step. This second stage reaction is conducted at the reflux temperature of the system which depends upon the reactants and the amount of solvent present. This temperature generally is in the range of 75° C. to about 160° C.

The preparation of alcohol blocked N-hydroxymethyl unsaturated acid amides by a two-stage process with intermediate purification between stages can best be illustrated by reference to the following examples. These examples are illustrative only, and are not intended to limit the unsaturated acid amides or alcohols and particularly the solvents to which this invention applies.

*Example 1*

In a three liter, round-bottom, three-neck flask, equipped with agitator, thermometer, and addition funnel, 284 grams (4 mols) of acrylamide, 102 grams of ethanol and 1.2 grams of potassium nitrite as a polymerization inhibitor (found unnecessary), are heated with agitator to be held at 55° C. When the flask contents have liquified at 48° C., .5 ml. of 11 N. sodium hydroxide solution is added to the reaction mixture followed by the addition of 164 grams (5 mols) of paraformaldehyde and the dropwise addition of 1.5 ml. of 11 N. sodium hydroxide solution. The pH of the reaction mixture is between 8 and 9. As the paraformaldehyde dissolves, the pH of the reaction mixture drops. To maintain the pH between 8 and 9, additional caustic is added by means of the addition funnel in .2 increments. The flask contents are held at 55° C. for a period of one hour after the paraformaldehyde has dissolved or the pH has stabilized. At the end of this time, 800 grams of toluene are added and the flask contents are heated for 15 to 20 minutes to 55° C. The product is then filtered to remove unreacted acrylamide, N-methylol acrylamide remaining in solution.

The filtered N-methylol acrylamide solution and 1,000 grams of butanol are combined in a three liter, round-bottom, three-neck flask equipped with agitator, thermometer, and addition funnel. By means of the addition funnel, enough 85 percent phosphoric acid is added to the flask contents to neutralize the sodium hydroxide used in the hydroxymethylation step and to give the reaction mixture a pH of 3 to 3.5. The reaction mixture is stirred for 30 to 45 minutes to allow the uniform distribution of the acid and the neutralization of the alkali. After the reaction mixture is uniform, 1.2 grams of hydroquinone are added to the flask contents and the addition funnel is replaced with a Barrett type azeotropic distillation apparatus. The reaction mixture is heated with agitation to reflux and held at reflux until virtually no water comes off (a period of three to six hours), that is, until only one milliliter of aqueous liquid separates in the Barrett tube in one hour. The acid is then neutralized with sufficient 33⅓ percent aqueous sodium hydroxide to give a pH of 7. The salt and other insoluble matter are then filtered out (6.3 grams) and the impurities and solvents are removed under vacuum at about 40 mm. pressure, a head temperature of 46° C., and a pot temperature of 120° C. The product (N-butoxy methyl acrylamide) weighing 612.8 grams by weight represents a 97.6 percent yield, has a color of 16 and a viscosity of A-1.

*Example 2*

In accordance with Example 1, another batch of N-methylol acrylamide is prepared using the same materials and quantities. To this resulting filtered N-methylol acrylamide solution are added 1,000 grams of 2-ethylhexanol and 2 cc. of 85 percent phosphoric acid to give the reaction mixture a pH of 3. The reaction mixture is stirred for 30 to 45 minutes after which 1.2 grams of hydroquinone are added and the flask is set up for azeotropic distillation. The flask contents are heated 125° C. until one milliliter or less of aqueous liquid comes over into the Barrett tube in an hour (over a period of eight hours) azeotropically distilling off 158.5 ml. of water layer. To neutralize the reaction mixture, 9.2 ml of a 33⅓ percent solution of aqueous sodium hydroxide solution diluated 1/20 are added. The reacted mixture is filtered and set up for vacuum distillation. The mixture is then heated under vacuum (about 75 mm.) to a temperature of 165° C. to 168° C. over a period of about six hours to remove solvents. The resulting product (831.7 grams of N-(2-ethylhexoxy) methyl acrylamide) has a Gardner-Holdt viscosity of C to D and a Gardner-Holdt color of 9 to 10, the yield being 97.6 percent of theoretical amount.

*Example 3*

In a one liter, three-neck, round-bottom flask equipped with thermometer, agitator, reflux condenser, and a large and a small addition funnel, 50 grams of styrene, 30 grams of 2-ethylhexyl acrylate, and 20 grams of the N-(2-ethylhexoxy) methyl acrylamide prepared in Example 2 are heated to 95° C. At this temperature, alternating increments of 20 cc. and 10 cc. of a catalyst solution made up of 10 grams of benzoyl peroxide dissolved in 100 grams of xylene are added by means of the small addition funnel over a period of one hour, and 400 grams of xylene are added by means of the large addition funnel at a slow dropwise rate over a period of two and one-half hours. During the additions of xylene and catalyst solution, the flask contents are refluxed at a temperature of 95° C. After all of the xylene has been added, the resulting 44.8 percent solids copolymer solution having a Gardner-Holdt viscosity of U is cooled and poured into a suitable container.

A blend is made from the resulting copolymer solution by mixing together 500 grams of the copolymer solution, 300 grams of 2-butoxyethanol, and 40 grams of a 25 percent solution of the morpholine salt of butyl acid phosphate in butanol. Films are rolled out on tin plates and cured at 425° F. for ten minutes. Very tough films are produced having excellent flexibility, mar resistance, adhesion, and resistance to boiling water.

*Example 4*

In accordance with Example 1, another batch of N-methylol acrylamide is prepared using the same materials and quantities. To this resulting filtered N-methylol acrylamide solution are added 1,000 grams of butyl alcohol and 3.5 cc. of 85 percent phosphoric acid to give the reaction mixture a pH of 3. The reaction mixture is stirred for 30 to 45 minutes after which 1.2 grams of hydroquinone are added and the flask is set up for azeotropic distillation. The flask contents are heated to 105° C. until one milliliter or less of aqueous liquid comes over into the Barrett tube in an hour (over a period of six hours) azeotropically distilling off 109.8 ml. of water layer. To neutralize the reaction mixture, sufficient 33⅓ percent solution of aqueous sodium hydroxide solution diluated 1/20 are added to obtain a pH of 7. The reacted mixture is filtered and prepared for vacuum distillation. The mixture is heated under vacuum (about 40 mm.) to a temperature of 120° C. over a period of about one hour to remove solvents. The resulting product (612.8 grams of N-butoxy methyl acrylamide) has a Gardner-Holdt viscosity of A–1 and a Gardner-Holdt color of 16, the yield being 97.6 percent of theoretical.

*Example 5*

Into a one liter, three-neck reaction vessel fitted with an agitator, Barrett azeotropic distillation apparatus and addition funnel are weighed 161.2 grams of N-methyl acrylamide, 500 grams of benzyl alcohol, 1 cc. of 85 percent phosphoric acid, 0.4 gram of hydroquinone and 100 cc. of toluene. These reactants are slowly heated with agitation to the reflux temperature of the system which is 70° C. At this temperature, water begins to azeotrope over. This azeotropic distillation is continued until no water comes over into the Barrett tube, for a period of about five hours. At this point, the mixture is cooled and the pH of 2 is adjusted to 7 with 1 N sodium hydroxide. The resulting mixture is filtered and distilled under vacuum (about 25 mm.) at a temperature of 165° C. to remove solvents. The resulting N-benzylate of N-methylol acrylamide weighs 259 grams.

*Example 6*

In accordance with Example 1, another batch of N-methylol acrylamide is prepared using the same materials and quantities. To this resulting filtered N-methylol acrylamide solution are added 1,000 grams of methyl alcohol and 5.38 cc. of 85 percent phosphoric acid to give the reaction mixture a pH of 3. The reaction mixture is stirred for 30 to 45 minutes after which 1.2 grams of hydroquinone are added and the flask is set up for total reflux distillation. The flask contents are heated to 65° C. for a period of four hours. To neutralize the reaction mixture, 4.96 ml. of a 11.4 normal solution of aqueous sodium hydroxide solution diluted 1/20 are added. The resulting mixture is filtered and set up for vacuum distillation. The mixture is distilled under vacuum (about 45 mm.) to a temperature of 53° C. over a period of about two hours to remove solvents. The resulting product (464 grams of N-methoxy methyl acrylamide) has a Gardner-Holdt viscosity of A–1 and a Gardner-Holdt color of 1, the yield being 100 percent.

*Example 7*

In accordance with Example 1, another batch of N-methylol acrylamide is prepared using the same materials and quantities. To this resulting filtered N-methylol acrylamide solution are added 1,000 grams of ethyl alcohol and 5 cc. of 85 percent phosphoric acid to give the reaction mixture a pH of 3. The reaction mixture is stirred for 30 to 45 minutes after which 1.2 grams of hydroquinone are added and the flask is set up for azeotropic distillation. The flask contents are heated to 78° C. until one milliliter or less of aqueous liquid comes over into the Barrett tube in an hour (over a period of four hours) azeotropically distilling off water. To neutralize the reaction mixture, 4.71 ml. of 11.3 normal sodium hydroxide solution are added. The reacted mixture is filtered and set up for vacuum distillation. The mixture is distilled under a slight vacuum of about 300 mm. to a temperature of 145° C. to 168° C. over a period of about two hours to remove solvents. The resulting product (831.7 grams of N-ethoxy methyl acrylamide) has a Gardner-Holdt viscosity of B to C and a Gardner-Holdt color of 9 to 10.

The foregoing examples graphically illustrate that N-substituted alkoxy and aralkoxy methyl acrylamides and similar amides can be conveniently prepared by the process of this invention. The examples also show that resulting alcohol blocked N-hydroxymethyl unsaturated acid amide monomers function very well in polymerization reactions because they are free of cross-linking by-products. In addition, the work exemplifies a novel method of removing methylene bis-N-acrylamide, or methacrylamide from the system. Also illustrated is a method for removing salts formed by the acids and bases necessary to adjust the pH values as desired for the reactions involved. As indicated hereinbefore, a considerable latitude is permissible insofar as the choice of non-polar and amphiprotic solvents is concerned. Further, the blocking alcohol employed will depend upon the desired end use. It will be appreciated, therefore, that

What is claimed is:
1. In a process for the preparation of an alcohol blocked N-methylol unsaturated acid amide of the formula

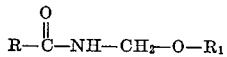

wherein the formation of methylene bis-N-unsaturated acid amide is minimized and which comprises
(1) reacting, in an amphiprotic solvent as the reaction medium at a pH of from about 8.5 to about 9.5,
(A) an unsaturated acid amie of the formula

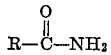

with
(B) formaldehyde
to form
(C) an N-methylol unsaturated acid amide of the formula

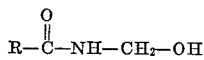

in admixture with said (A),
and
(2) reacting a hydrocarbyl alcohol of not more than 12 carbon atoms with said N-methylol unsaturated acid amide at a pH of from about 2.5 to about 6 to produce a solution of said alcohol blocked N-methylol unsaturated acid amide, with
(a)

representing the residue of an unsaturated acid selected from at least one member of the group consisting of acrylic acid, methacrylic acid and crotonic acid, and
(b) —O—$R_1$ representing the residue of a hydrocarbyl alcohol of not more than 12 carbon atoms,
the improvement which comprises
(I) adding to said mixure (C) in said amphiprotic solvent, once said reaction (1) is substantially complete and prior to said reaction (2), sufficient nonpolar solvent to substantially insolubilize unreacted (A),
(II) separating out the thus-insolubilized (A) by physical means, thereby preventing its later reaction with said N-methylol unsaturated acid amide to form methylene bis-N-unsaturated acid amide, and
(III) subjecting the resulting solution, substantially free of said (A), to said reaction (2).

2. A process as described in claim 1 wherein said nonpolar solvent is an aromatic hydrocarbon.
3. A process as described in claim 1 wherein said nonpolar solvent is toluene.
4. A process as described in claim 1 wherein said (A) is acrylamide
5. A process as described in claim 1 wherein said (A) is methacrylamide.
6. A process as described in claim 1 wherein said (A) is crotonamide.
7. A process as described in claim 1 wherein said hydrocarbyl alcohol has 1 to 4 carbon atoms, inclusive, and the thus-obtained solution of alcohol blocked N-methylol unsaturated acid amide is distilled to remove the solvents therefrom.
8. A process as described in claim 1 wherein said hydrocarbyl alcohol has 4 to 12 carbon atoms, inclusive, and the thus-obtained solution of alcohol blocked N-methylol unsaturated acid amide is distilled to remove the solvents therefrom.
9. A process as described in claim 1 wherein said physical means comprise filtration.

References Cited by the Examiner
UNITED STATES PATENTS

| | | | |
|---|---|---|---|
| 2,689,844 | 9/1954 | Melamed | 260—72 |
| 2,760,977 | 8/1956 | Feuer et al. | 260—561 |
| 2,810,713 | 10/1957 | Melamed | 260—561 |
| 3,079,434 | 2/1963 | Christenson et al. | 260—561 |
| 3,087,965 | 4/1963 | Dowbenko et al. | 260—561 |

FOREIGN PATENTS
1,230,790 9/1960 France.

WALTER A. MODANCE, *Primary Examiner.*
NICHOLAS S. RIZZO, *Examiner.*
R. L. PRICE, N. TROUSOF, *Assistant Examiners.*